(12) United States Patent
Ishikawa et al.

(10) Patent No.: US 8,276,963 B2
(45) Date of Patent: Oct. 2, 2012

(54) STORAGE STRUCTURE HAVING A LID

(75) Inventors: Kohki Ishikawa, Toyota (JP); Ichiro Kamada, Toyota (JP); Yuuitsu Sakuraba, Sakura (JP); Yasuhiro Sakakibara, Nishikasugai-gun (JP)

(73) Assignees: Fujikura Ltd., Tokyo (JP); Toyoda Gosei Co., Ltd., Nishikasugai-Gun (JP)

( * ) Notice: Subject to any disclaimer, the term of this patent is extended or adjusted under 35 U.S.C. 154(b) by 1693 days.

(21) Appl. No.: 11/313,618

(22) Filed: Dec. 22, 2005

(65) Prior Publication Data
US 2006/0166557 A1 Jul. 27, 2006

(30) Foreign Application Priority Data
Dec. 27, 2004 (JP) ................ P2004-377280

(51) Int. Cl.
*B60R 7/04* (2006.01)
(52) U.S. Cl. .................... 296/24.34; 296/37.8
(58) Field of Classification Search ............. 296/24.34, 296/37.8; 220/830, 264, 263, 262, 827, 825, 220/810
See application file for complete search history.

(56) References Cited

U.S. PATENT DOCUMENTS

| 5,329,212 | A | * | 7/1994 | Feigleson | 220/260 |
| 6,139,073 | A | * | 10/2000 | Heffner et al. | 292/201 |
| 2006/0060620 | A1 | * | 3/2006 | Schmidt et al. | 224/275 |
| 2006/0108823 | A1 | * | 5/2006 | Schmidt et al. | 296/70 |

FOREIGN PATENT DOCUMENTS

JP 10-244886 A 9/1998

\* cited by examiner

*Primary Examiner* — J. Gregory Pickett
*Assistant Examiner* — Andrew Perreault
(74) *Attorney, Agent, or Firm* — Sughrue Mion, PLLC

(57) ABSTRACT

A storage structure, including: a main body portion including an opening portion and a cable outlet portion; a lid slidably mounted on the main body portion to open and close the opening portion, the lid including a cable introductory portion; and a flat plate-shaped cable including a first end at the cable outlet portion, a second end at the cable introductory portion, and a cable slack portion between the first and second ends, where the length of the cable slack portion between the cable outlet portion and the cable introductory portion is set to be equal to or more than the distance between the cable outlet portion and the cable introductory portion, both when the lid is positioned to open and to close the opening portion.

15 Claims, 4 Drawing Sheets

STORAGE STRUCTURE HAVING A LID

CROSS-REFERENCE TO RELATED APPLICATIONS

This application is based upon and claims the benefit of priority from Japanese Patent Application No. 2004-377280, filed Dec. 27, 2004 in the Japanese Patent Office, the disclosure of which is incorporated herein in its entirety by reference.

BACKGROUND OF THE INVENTION

1. Field of the Invention

Devices, systems, and methods consistent with the invention relate to a lidded storage structure which is provided in an occupant compartment of a vehicle, such as an automotive vehicle, and more particularly, to a storage structure having an opening and closing type sliding lid.

2. Description of the Related Art

Generally, a console is provided between driver and front passenger seats, serving as an arm rest and as a storage unit in a vehicle such as an automotive vehicle. Such a storage unit, generally called a console box, has an opening at the top and a lid which opens and closes said opening thereof and whose upper surface is made of a soft material or cloth.

In a related art structure of a console box, a lid for opening and closing the console box is rotatably connected to a side of the box at a rear end of the lid (in a front-rear direction of the vehicle), whereas a front end of the lid is provided with a locking mechanism. The lid can be opened by releasing the lock and thereafter lifting the lid front end.

In another related art structure, a lid is slidable in a vehicle body front-rear direction and is opened by sliding toward a vehicle body rear side and then lifting a lid front end while keeping this sliding state of the lid (or while continuing to slide the lid).

In addition, in order to improve the operability of various kinds of equipment or instruments to be mounted in a vehicle, a related art lid of a console box is provided with switches and electrical indicators. In a console box with such electrical components provided therein, when installing a wiring within a lid of the console box, flexible printed circuit boards (FPC), flexible flat cables (FFC) and the like are used to comply with space requirements and with requirements of anti-bending performance. In the case where a wiring is installed within such a rotatable type of lid of a console box as described above, if a transition portion of the wiring from the console box to the lid is set and disposed in the vicinity of a center of rotation of the lid, it is unnecessary to have a margin (slack or extra length) for the wire because there is almost no relative movement between a wire portion fixed to the console box and a wire portion fixed to the lid. However, in the case of a so-called slidable type of lid which is slid with respect to a console box, because of movement of the entire lid relative to the console box, it is necessary to have slack or extra length of wire, which enables such movement.

In the case in which wire slack is provided when installing a wiring across a stationary part and a movable part connected to the stationary part, it is necessary to house a wire slack portion, which changes in shape according to movement of the movable part, within a predetermined area or region in a desired manner. To respond thereto, the slack portion is applied with kinks or bends in advance. Such kinks or bends applied to the slack portion are easily and appropriately bent or curved along the kinks or bends when an outlet portion where the wire is drawn out of the stationary part and an introductory portion where the wire is introduced in the movable part come closer to each other in such a manner as to induce a stress in the wire. An example thereof is disclosed in, for example, Japanese Unexamined Patent Application, First Publication No. 10-244886. This published document describes a structure in which a flat cable is wired between a body and a door, wherein a slack portion of the flat cable is bent and thereafter housed in an accommodating region which is provided in the door, and a band-shaped spring made of metal is also housed in the accommodating region, one end of the spring being fixed to a body side and the other end being fixed to an inside of the accommodating region. With this spring, even if the door is continually opened and closed, the bent shape of the slack portion can be maintained.

In the case in which, when a slack of a cable is laid across a console and a slide type lid, an additional member or band-shaped spring such as that disclosed in the above-mentioned document is used, it is necessary to deform the additional member when opening and closing the lid. Thus, there is a risk of the opening and closing operation being hindered. Further, because an additional member of this kind is inevitably used, productivity or assemble-ability is surely decreased. As a result, the cost of production is increased.

On the other hand, because flexible printed circuit boards and flat cables have flexibility and flat plate-shapes, it is possible to previously apply kinks or bends with respect thereto. However, if such kinks or bends are to be applied to a slack of a cable prior to assembling the console, there is an increase in operation time and facility size in order to achieve this. As a result, the number of man-hours involved for assembling each console box will be increased, and therefore, productivity and assemble-ability thereof will be deteriorated.

SUMMARY OF THE INVENTION

In consideration of the above circumstances, an object of the invention is to provide a storage structure having a lid, in which the handling of a slack of wire or cable is easy and therefore productivity and assemble-ability are superior as compared to the related art storage structure.

In order to achieve the above object, according to an aspect of the invention, a storage structure is provided, including: a main body portion including an opening portion and a cable outlet portion; a lid slidably mounted on the main body portion to open and close the opening portion, the lid including a cable introductory portion; and a flat plate-shaped cable including a first end at the cable outlet portion, a second end at the cable introductory portion, and a cable slack portion between the first and second ends, wherein the length of the cable slack portion between the cable outlet portion and the cable introductory portion is set to be equal to or more than the distance between the cable outlet portion and the cable introductory portion, both when the lid is positioned to open and to close the opening portion.

In another aspect of the invention, the storage structure includes: a guide member on the main body portion, where the guide member slidably retains the lid; a lower surface of the lid and an upper surface of the guide member confront each other between the cable outlet portion and the cable introductory portion, thereby forming confronting portions; and the cable introductory portion is set to be positioned constantly within a variable range defined by the confronting portions.

In another aspect of the invention, a length of the flat plate-shaped cable positioned between the cable outlet portion and the cable introductory portion is set to be longer than a length of the confronting portions when the lid is in a moving state.

In another aspect of the invention, when the lid is slid to open the opening portion a length of the flat plate-shaped cable positioned between the cable outlet portion and the cable introductory portion is less than two times the length of the confronting portions.

In another aspect of the invention, the lid is assembled to the main body portion by being slid thereon; and the length of the cable slack portion between the cable outlet portion and the cable introductory portion is also set to be equal to or more than the distance between the cable outlet portion and the cable introductory portion when the lid is being assembled to the main body portion.

In another aspect of the invention, the cable introductory portion is formed by an interface between the lid and a cover attached to the lid; and the second end of the flat plate-shaped cable is sandwiched between the lid and the cover.

In another aspect of the invention, the cable outlet portion is formed by an interface between the guide member and a cover attached to the guide member; and the first end of the flat plate-shaped cable is sandwiched between the guide member and the cover.

In another aspect of the invention, a storage structure is provided, including: a main body portion including an opening portion; a lid slidably mounted on the main body portion to open and close the opening portion; a sensor, at a first end of the lid; a locking mechanism, which releasably locks the lid with respect to the main body portion; and a flat plate-shaped cable, in the lid, which electrically connects the sensor and the locking mechanism.

In another aspect of the invention, the main body portion includes: a cable outlet portion; the lid includes a cable introductory portion; the flat plate-shaped cable includes a first end at the cable outlet portion, a second end at the cable introductory portion, and a cable slack portion between the first and second ends, wherein the length of the cable slack portion between the cable outlet portion and the cable introductory portion is set to be equal to or more than the distance between the cable outlet portion and the cable introductory portion, both when the lid is positioned to open and to close the opening portion.

In another aspect of the invention, the storage structure includes a guide member on the main body portion, where the guide member slidably retains the lid; a lower surface of the lid and an upper surface of the guide member confront each other between the cable outlet portion and the cable introductory portion, thereby forming confronting portions; and the cable introductory portion is set to be positioned constantly within a variable range defined by the confronting portions.

In another aspect of the invention, a length of the flat plate-shaped cable positioned between the cable outlet portion and the cable introductory portion is set to be longer than a length of the confronting portions when the lid is in a moving state.

In another aspect of the invention, when the lid is slid to open the opening portion, a length of the flat plate-shaped cable positioned between the cable outlet portion and the cable introductory portion is less than two times a length of the confronting portions.

In another aspect of the invention, the lid is assembled to the main body portion by being slid thereon; and the length of the cable slack portion between the cable outlet portion and the cable introductory portion is also set to be equal to or more than the distance between the cable outlet portion and the cable introductory portion when the lid is being assembled to the main body portion.

In another aspect of the invention, the cable introductory portion is formed by an interface between the lid and a cover attached to the lid; and the second end of the flat plate-shaped cable is sandwiched between the lid and the cover.

In another aspect of the invention, the cable outlet portion is formed by an interface between the guide member and a cover attached to the guide member; and the first end of the flat plate-shaped cable is sandwiched between the guide member and the cover.

BRIEF DESCRIPTION OF THE DRAWINGS

The above features and advantages of the invention will become more apparent by describing in detail exemplary embodiments thereof with reference to the attached drawings in which.

DETAILED DESCRIPTION OF THE INVENTION

Exemplary embodiments of the invention will now be described below by reference to the attached Figures. The described exemplary embodiments are intended to assist the understanding of the invention, and are not intended to limit the scope of the invention in any way.

Figure 4:
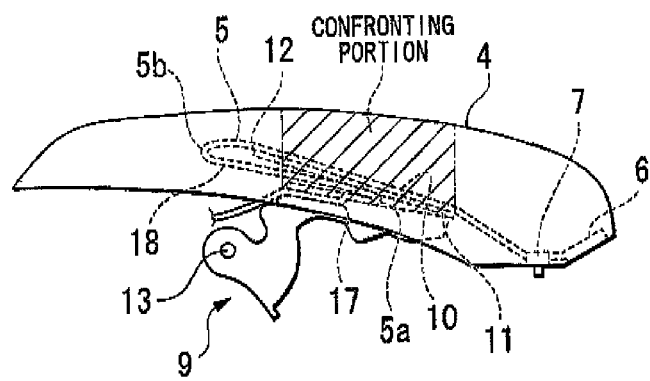
FIG. 4 is a schematic diagrammatical view illustrating the lid body in a rearward position (or a first position)
Figure 5:
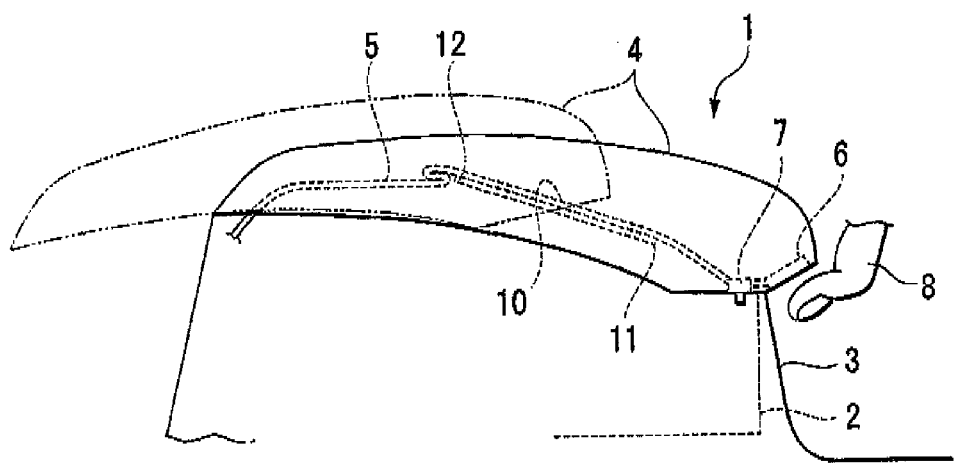
FIG. 5 is a side view schematically illustrating the exemplary storage structure according to the invention.
Figure 6:
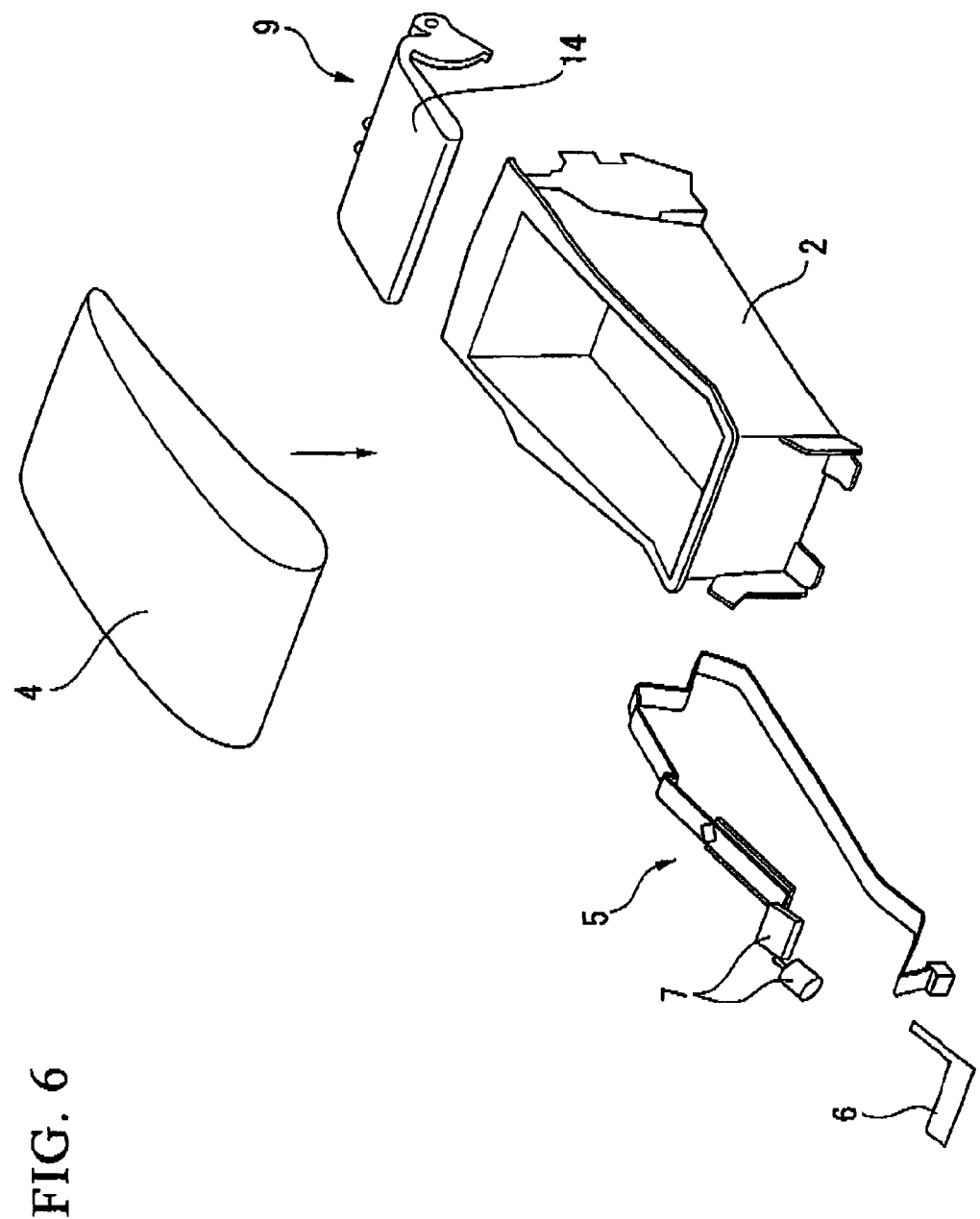
FIG. 6 is an exploded perspective view of the exemplary storage structure according to the invention.
Figure 7:
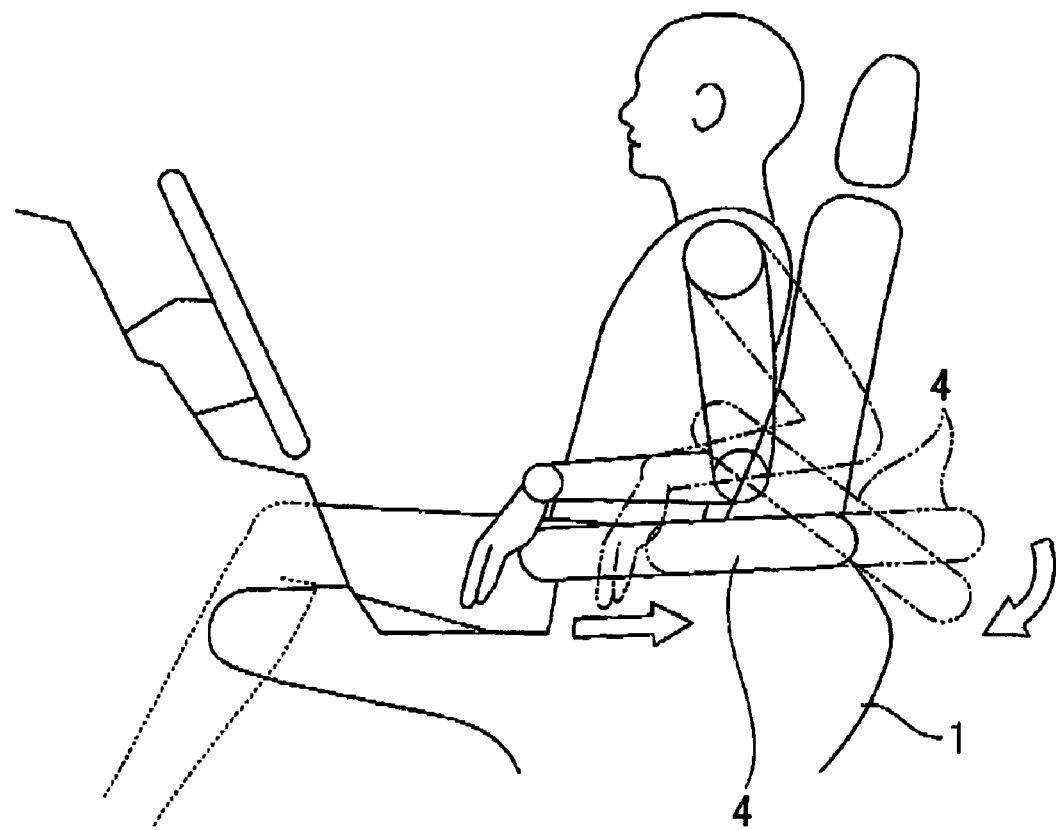
FIG. 7 is a side view schematically illustrating another embodiment of a storage structure in an operative condition according to the invention.

Hereinafter, an exemplary embodiment of a storage structure according to the invention will be described with reference to FIGS. 1 through 6. A storage structure (console) 1 is disposed, as one example, in the vicinity of a driver's seat of an automotive vehicle. As schematically shown in FIGS. 5 and 6, the storage structure 1 includes a box 2; a main body portion 3 within which the box 2 is housed, and a lid body 4 that is structured in such a manner as to slide in a vehicle body front-rear direction to open and close an opening portion of the box 2. FIG. 4 denotes a state in which the lid body 4 is in a rearward position (or a first position) and FIG. 3 denotes a state in which the lid body 4 is in a forward position (or a second position). Incidentally, a structure is possible in which, when the lid body 4 is in the rearward position, a front end of the lid body 4 is rotatable and liftable (see FIG. 7).

A wire harness is laid within the lid body 4. As the wire harness, a flat plate-shaped cable 5 such as a flexible printed circuit board or a flat cable and the like is used. Through a connecting section relative to the main body portion 3, the flat plate-shaped cable 5 is introduced in the lid body 4. This flat plate-shaped cable 5 serves, as an example, to control the opening and closing of the lid body 4 and is connected to a sensor 6 such as a proximity sensor or a touch sensor, which is provided on a bottom surface of the front end of the lid body 4, and to an electromagnetic locking mechanism (or power lock mechanism) 7, which is provided on the lid body 4 in such a manner as to correspond to an inner side of an opening end portion of the box 2. Further, preselected portions of the flat plate-shaped cable 5 at the main body portion 3 side are connected to an unillustrated controller and an unillustrated power supply. More specifically, when the opening portion of the box 2 is closed by the lid body 4 or in a closed state, the electromagnetic locking mechanism 7 is engaged in a predetermined portion of the main body portion 3, so that the lid body is locked in the closed state. In this state, if a finger 8 approaches or touches the sensor 6, the sensor 6 outputs a signal, thus activating the electromagnetic locking mechanism 7 to unlock.

Figure 1:
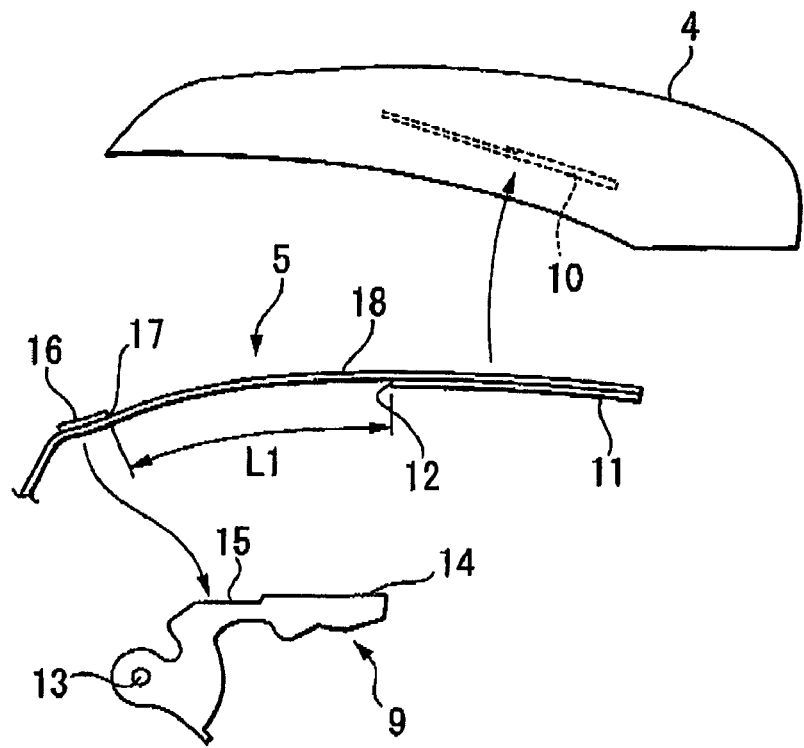
FIG. 1 is an exploded view of an exemplary embodiment of a storage structure according to the invention, illustrating a mutual relationship among a lid body, a guide member to slidably retain the lid body, and a flat plate-shaped cable.

Next, an arrangement of the aforementioned, flat plate-shaped cable 5 will be described in detail. FIG. 1 shows a mutual relationship among the lid body 4, a guide member 9 to slidably retain the lid body, and the flat plate-shaped cable 5. A securing portion 10 for securing the flat plate-shaped cable 5 is provided on an inner bottom surface of the lid body 4. A distal end of the flat plate-shaped cable 5 is fixed to the securing portion 10 by sandwiching it between the securing portion 10 and a cover 11, which is placed upon a bottom surface of the former. Thus, a rear end of the cover 11 forms a cable introductory portion 12 for introducing the flat plate-shaped cable 5 in the lid body 4. Incidentally, the flat plate-shaped cable 5, which is so secured, is then electrically connected to unillustrated electrical machinery provided in the lid body 4.

On the other hand, the guide member 9 is located at a rear end side within the main body portion 3 and secured to the main body portion 3 by means of a rotating shaft 13. An upper surface portion of the guide member 9 is a guide portion 14, which is in sliding engagement with the lid body 4. In other words, the guide portion 14 is a portion by which the lid body 4 is guided to slide in the (vehicle) front-rear direction. This structure can be formed of a convex-shaped portion and a confining groove which is formed, e.g., on an inner surface of a sidewall portion of the lid body 4 and within which the convex-shaped portion is in sliding engagement. Further, it can be formed of a pin or roller, which is provided on the lid body 4, and a confining guide groove, which is extended in the front-rear direction of the lid body 4 and within which the pin or roller is in rolling engagement. Furthermore, it can be formed of a pin or roller and a confining guide groove, which is formed and extended in the front-rear direction of the lid body 4 and within which the pin or roller is in sliding engagement.

A rear end portion of the guide portion 14 includes a fixing portion 15 to which the flat plate-shaped cable 5 is fixed. An intermediate portion of the flat plate-shaped cable 5 is fixed to the fixing portion 15 by sandwiching it between the fixing portion 15 and a cover 16 which is placed upon a bottom surface of the former. Thus, a front end of the cover 16 forms a cable outlet portion 17 out of which the flat plate-shaped cable 5 is drawn to be directed toward the lid body 4.

Figure 2:
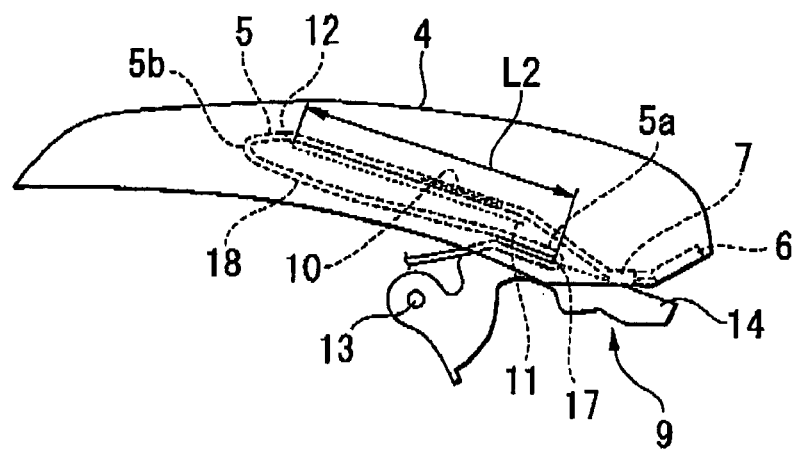
FIG. 2 is a schematic diagrammatical view illustrating a mounting state in which the lid body is slid in the guide member (main part thereof)

The guide member 9 and the lid body 4 mentioned above are brought into sliding engagement by moving the lid body 4 from a rear side toward a front side of the guide portion 14. FIG. 2 diagrammatically illustrates a state at the time of such engagement or assembling. The distal end of the flat plate-shaped cable 5 is fixed in advance to the securing portion 10 of the lid body 4 by means of the aforementioned cover 11. Further, an intermediate portion of the flat plate-shaped cable 5 is fixed to the fixing portion 15 of the guide member 9 by means of the cover 16. During assembly, the lid body 4 is moved or placed sufficiently to the rear of the guide member 9 and then moved forward relative to the guide member 9. Immediately before the lid 4 is assembled to the guide member 9, the cable introductory portion 12 is rearwardly positioned (i.e., the rear side in the vehicle front-rear direction) relative to the cable outlet portion 17 of the guide member 9. The flat plate-shaped cable 5 is somewhat loosely extended between the cable introductory portion 12 and the cable outlet portion 17. This somewhat loosely extended portion is a so-called slack portion of the flat plate-shaped cable 5 (hereinafter referred to as cable slack portion). A length (L1) of this cable slack portion is set to be equal to or more than a distance (L2) between the cable introductory portion 12 and the cable outlet portion 17 at the time of beginning of assembling/mounting of the lid body 4 to/upon the guide member 9 (the main body portion 3).

As described above, when the lid body 4 is mounted upon or assembled to the guide member 9, a position of the lid body 4 is set such that the cable introductory portion 12 is positioned remotely from the rear of or far behind the cable outlet portion 17. In other words, the cable slack portion 18 of the flat plate-shaped cable 5 is set in an almost fully extended condition or extended rearwardly from the cable outlet portion 17, and thereafter, the cable slack portion 18 is received in the lid body 4. As a result, the cable slack portion 18 is bent in such a manner as to have two folded portions, and the cable slack portion 18 together with a cable portion which is fixed to the fixing portion 15, present a substantially S-shaped configuration. More specifically, U-shaped curved portions 5*a* and 5*b* of the flat plate-shaped cable 5 are formed in the vicinities of the cable introductory portion 12 and the cable outlet portion 17, respectively.

Figure 3:
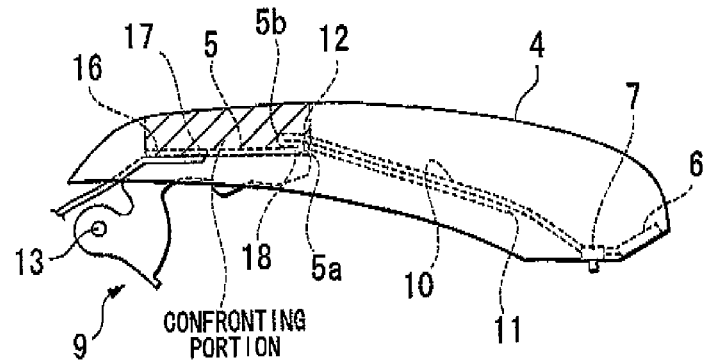
FIG. 3 is a schematic diagrammatical view illustrating the lid body in a forward position (or a second position)

FIG. 3 illustrates a state in which the lid body 4 is slidably mounted upon the guide member 9 and thereafter moved to a forward position (or a second position). This state is one in which the opening portion of the box 2 of the console 1 is closed by the lid body 4. The lid body 4 is forwardly moved relative to the guide member 9, so that the cable introductory portion 12 at a lid body 4 side is moved to and located sufficiently in front of the cable outlet portion 17. At this time, the whole length of the cable slack portion 18 of the flat plate-shaped cable 5 is greater than the distance between the cable outlet portion 17 and the cable introductory portion 12 at the time in which the lid body 4 is located in the forward position.

Therefore, in the case in which the lid body 4 is slidably moved toward a forward position, the configuration of the S-shaped cable slack portion is changed such that one of the curved portions, e.g., the curved portion 5*a* at a vehicle front direction side, advances along an upper surface of the guide member 9. Alternatively, the configuration of the S-shaped cable slack portion is changed such that the other of the curved portions, i.e., the curved portion 5*b*, advances along the guide member upper surface. FIG. 3 denotes the latter changing (or configuration) as an example. Although the S-shaped cable slack portion 18 is stretched, a small S-shaped portion of the flat plate-shaped cable 5 is properly formed in the vicinity of the cable introductory portion 12 or of the cable outlet portion 17 or on an intermediate portion of the cable slack portion 18 because of the cable slack portion being maintained. In other words, the length of the cable slack portion 18 is greater than the distance between the cable introductory portion 12 and the cable outlet portion 17, and therefore, during back and forth movement of the lid body 4, at least the S shape of the cable slack portion 18 is maintained.

As a result, it is possible to prevent the flat plate-shaped cable 5 from becoming entangled or twisted.

Additionally, when the lid body 4 is located in the forward position, the cable introductory portion 12 almost coincides with a front end of the guide member 9 in terms of vehicle front-rear directional positions, or the cable introductory portion 12 is positioned at a rear of or behind the guide member front end. The cable slack portion 18 is enclosed within a predetermined space, which is formed by confronting portions of the lid body 4 and the guide member 9. The S-shaped bending state of the cable slack portion is at least maintained.

FIG. 4 denotes a state in which the lid body 4 is in a rearward position (i.e., the first position). As described above, in the state shown in FIG. 3 (i.e., a forward or second position), the opening portion of the box 2 of the console 1 is closed by the lid body 4. The lid body 4 is rearwardly moved along the guide member 9 and then located in the rearward position as illustrated in FIG. 4. In both the forward (FIG. 3) and rearward (FIG. 4) positions, and in the assembly position (FIG. 2), the cable slack portion 18 constantly has the S-shaped configuration. In other words, the basic configuration or bending state of the cable slack portion 18 is maintained. As a result, it is possible to prevent the flat plate-shaped cable 5 from becoming entangled or twisted.

Further, even if the lid body 4 is moved and located at the rearward position, there are confronting portions formed by the upper surface of the guide member 9 and the bottom surface of the lid 4. A length of the S-shaped cable slack portion is set to be less than two times the length of the confronting portions at a time in which the lid is in the second position (the rearward position). In other words, the S-shaped cable slack portion can advantageously and exactly be housed within a space defined by the confronting portions.

As seen from the foregoing description, according to the invention, when the flat plate-shaped cable 5 is to be deployed between the main body portion 3 and the lid body 4, the cable slack portion 18 can be bent into an S-shape and confined between the main body portion and the lid body, without requiring any process or operation such as applying kinks or bends to the flat plate-shaped cable 5. As a result, the number of man-hours involved during an assembly operation of the console 1 can be decreased, and therefore, productivity and assemble-ability of the console 1 can be improved.

The invention is by no means limited to the above-described embodiment. It can be applied to a console having a lid body which is only slidable in a front-rear direction and which is not rotatable. Further, means other than the covers described by way of example may be used for fixing the flat plate-shaped cable.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A storage structure, comprising:
   a main body portion comprising an opening portion and a cable outlet portion;
   a lid slidably mounted on the main body portion to open and close the opening portion, the lid comprising a cable introductory portion; and
   a flat plate-shaped cable comprising a first end at the cable outlet portion, a second end at the cable introductory portion, and a cable slack portion between the first and second ends;
   a guide member on the main body portion, the guide member slidably retaining the lid; and a lower surface of the lid and an upper surface of the guide member confronting each other; and
   two U-shaped curved portions included in the cable slack portion, one of the U-shaped curved portions being close to the second end and moving in a moving direction of the lid along the upper surface of the guide member both when the lid is positioned to open and to close the opening portion, wherein,
   the length of the cable slack portion between the cable outlet portion and the cable introductory portion is set to be equal to or more than the distance between the cable outlet portion and the cable introductory portion, both when the lid is positioned to open and to close the opening portion, and wherein
   the cable slack portion constantly has the S-shaped configuration.

2. The storage structure according to claim 1, wherein:
   the lower surface of the lid and the upper surface of the guide member confront each other between the cable outlet portion and the cable introductory portion, thereby forming confronting portions; and
   the cable introductory portion is set to be positioned constantly within a variable range defined by the confronting portions.

3. The storage structure according to claim 2, wherein a length of the flat plate-shaped cable positioned between the cable outlet portion and the cable introductory portion is set to be longer than a length of the confronting portions when the lid is in a moving state.

4. The storage structure according to claim 2, wherein when the lid is slid to open the opening portion a length of the flat plate-shaped cable positioned between the cable outlet portion and the cable introductory portion is less than two times the length of the confronting portions.

5. The storage structure according to claim 1, wherein:
   the lid is assembled to the main body portion by being slid thereon; and
   the length of the cable slack portion between the cable outlet portion and the cable introductory portion is also set to be equal to or more than the distance between the cable outlet portion and the cable introductory portion when the lid is being assembled to the main body portion.

6. The storage structure according to claim 1, wherein: the cable introductory portion is formed by an interface between the lid and a cover attached to the lid; and the second end of the flat plate-shaped cable is sandwiched between the lid and the cover.

7. The storage structure according to claim 2, wherein: the cable outlet portion is formed by an interface between the guide member and a cover attached to the guide member; and the first end of the flat plate-shaped cable is sandwiched between the guide member and the cover.

8. A storage structure, comprising:
   a main body portion comprising an opening portion;
   a lid slidably mounted on the main body portion to open and close the opening portion;
   a sensor, at a first end of the lid;
   a locking mechanism, which releasably locks the lid with respect to the main body portion; and
   a flat plate-shaped cable, in the lid, which electrically connects the sensor and the locking mechanism, and wherein a guide member on the main body portion, the guide member slidably retaining the lid; and a lower surface of the lid and an upper surface of the guide member confronting each other;

the sensor is provided on a bottom surface of the front end of the lid, and a finger approaches or touches the sensor, the sensor outputs a signal, wherein the main body portion comprises a cable outlet portion;

the lid comprises a cable introductory portion;

the flat plate-shaped cable comprises a first end at the cable outlet portion, a second end at the cable introductory portion, and a cable slack portion between the first and second ends;

two U-shaped curved portions included in the cable slack portion, one of the U-shaped curved portions being close to the second end and moving in a moving direction of the lid along the upper surface of the guide member both when the lid is positioned to open and to close the opening portion, wherein the length of the cable slack portion between the cable outlet portion and the cable introductory portion is equal to or more than the distance between the cable outlet portion and the cable introductory portion, both when the lid is positioned to open and to close the opening portion, and wherein the cable slack portion constantly has the S-shaped configuration.

9. The storage structure, according to claim 8 wherein:

the main body portion comprising a cable outlet portion;

the lid comprises a cable introductory portion the flat plate-shaped cable comprises a first end at the cable outlet portion, a second end at the cable introductory portion, and a cable slack portion between the first and second ends; and the length of the cable slack portion between the cable outlet portion and the cable introductory portion is set to be equal to or more than the distance between the cable outlet portion and the cable introductory portion, both when the lid is positioned to open and to close the opening portion.

10. The storage structure according to claim 9, further comprising a guide member on the main body portion, wherein;

the guide member slidably retains the lid;

a lower surface of the lid and an upper surface of the guide member confront each other between the cable outlet portion and the cable introductory portion, thereby forming confronting portions; and the cable introductory portion is set to be positioned constantly within a variable range defined by the confronting portions.

11. The storage structure according to claim 10, wherein a length of the flat-plate shaped cable positioned between the cable outlet portion and the cable introductory portion is set to be longer than a length of the confronting portions when the lid is in a moving state.

12. The storage structure according to claim 10, wherein when the lid is slid to open the opening portion, a length of the flat plate-shaped cable positioned between the a cable outlet portion and the cable introductory portion is less than two times a length of the confronting portions.

13. The storage structure according to claim 9 wherein;

the lid is assembled to the main body portion by being slid thereon; and the length of the cable slack portion between the cable outlet portion and the cable introductory portion is also set to be equal to or more than the distance between the cable outlet portion and the cable introductory portion when the lid is being assembled to the main body portion.

14. The storage structure according to claim 9, wherein: the cable introductory portion is formed by an interface between the lid and a cover attached to the lid; and the second end of the flat plate-shaped cable is sandwiched between the lid and the cover.

15. The storage structure according to claim 10, wherein: the cable outlet portion is formed by an interface between the guide member and a cover attached to the guide member; and the first end of the flat plate-shaped cable is sandwiched between the guide member and the cover.

* * * * *